Feb. 15, 1944.                N. K. CHANEY                2,341,527
                    RECOVERY OF VALUABLE HYDROCARBONS
                          Filed Dec. 5, 1939
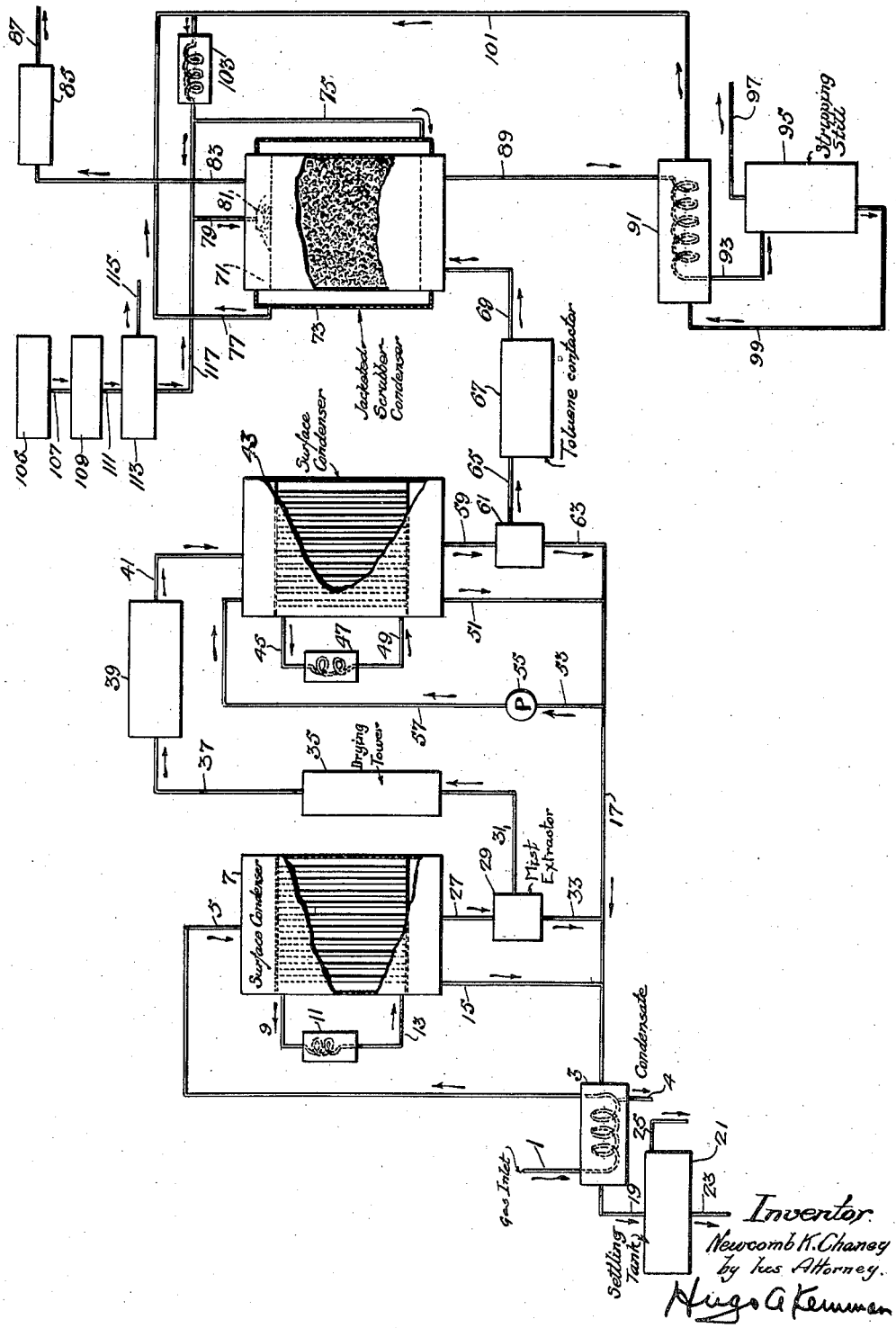
Inventor.
Newcomb K. Chaney
by his Attorney.

Patented Feb. 15, 1944

2,341,527

UNITED STATES PATENT OFFICE 2,341,527

RECOVERY OF VALUABLE HYDROCARBONS

Newcomb K. Chaney, Moylan, Pa., assignor to The United Gas Improvement Company, a corporation of Pennsylvania Application December 5, 1939, Serial No. 307,567

12 Claims. (Cl. 62—175.5)

This invention pertains generally to the recovery of valuable hydrocarbons from gas mixtures containing them.

The invention pertains particularly to the separation and recovery of valuable condensible hydrocarbons, including the unsaturated type, from a mixture of hydrocarbon gases obtained in the manufacture of a gas wherein petroleum oil is decomposed by means of pyrolysis, catalysis or both.

The invention pertains more particularly to a system for the separation and recovery of valuable hydrocarbons wherein the separation is brought about by the use of a combined cooling and scrubbing system.

The invention pertains still more particularly to such a system wherein the cooling and scrubbing are regulated in a novel manner to prevent difficulties due to stoppages in the condensing system caused by the presence in the gas mixture of certain constituents which solidify with comparative ease, with consequent increased efficiency and ease of recovery of the valuable hydrocarbons from the gas mixture undergoing treatment.

Various processes for the manufacture of artificial gas, such as carburetted water gas and oil gas, wherein a petroleum oil is decomposed pyrolytically (with the aid of catalysts, if desired), result in gaseous mixtures which contain difficultly condensible gaseous hydrocarbons, such as methane, ethane, propane, ethylene, propylene, etc., as well as some hydrogen. There are also present the vapors of relatively condensible substances which may be separated more or less completely from the gas mixture as tars and light oil condensates. The light oil condensate and distillate from the tar comprise a source of valuable hydrocarbons and particularly those of the resin-forming unsaturated type, such as indene, styrene, methyl styrene, cyclopentadiene, isobutylene, butylene, butadiene, piperylene, isoprene, etc.

For convenience, the invention will be described in connection with oil gas to which it is especially applicable. However, it will be understood that in its broad aspects it is applicable to any type of artificial or other gas (e. g., coal gas), containing substantial quantities of hydrocarbon constituents.

In removing the valuable hydrocarbons from artificial gas of the type described, for instance "oil-gas," cooling the gas to the required low temperatures presents a serious difficulty in that certain constituents of relatively high freezing point invariably found in the oil-gas (e. g., p-xylene, F. P. +13.35° C.; benzene, F. P. +5.56° C.; water, F. P. 0° C.) solidify in the condensing system resulting in stoppages as well as injury to the mechanical equipment (such as pumps, valve seats, etc.).

The use of a conventional washing or scrubbing oil (e. g., straw oil) to wash out the valuable hydrocarbons by contacting the gas (say countercurrently) presents the difficulty that many wash oils become too viscous at the temperatures involved to permit their efficient use.

An object of my invention is the provision of a simple and flexible hydrocarbon separation and recovery system to overcome the foregoing difficulties.

I prefer to cool the gas by regulated stages under carefully controlled temperature conditions.

For example, I may cool oil-gas from about 20° C. to just above the freezing point of water in the first stage, thus separating a large part of the water (carried over in the gas from the primary cooling equipment such as the wash-box of the gas manufacturing unit), benzene and any p-xylene that may be present.

The effluent gas from the first-stage condenser may be passed through a mist-extractor to remove entrained droplets of condensate and then through drying apparatus to remove substantially all the remaining moisture. To prevent the possibility of trouble arising from the formation of benzol ice during subsequent operations, I may, if desired, pass the gas through a device in which it is impregnated with the vapors of a substance of very low freezing point.

The gas is then introduced into a second-stage condenser wherein the temperature is suitably lowered to recover further quantities of condensate, for instance, chiefly benzene and toluene and possibly some C₈ as well as other hydrocarbons.

In the removal of light oil vapors from oil gas by cooling, the scrubbing action of the condensate itself is a major factor in the efficiency of removal of certain important hydrocarbon constituents.

For example, the recovery of benzene and $C_5$ hydrocarbons (hydrocarbons of five carbon atoms) is aided by the scrubbing action of the condensate itself. It follows, therefore, that the removal of benzene and $C_5$ hydrocarbons in the condensers is somewhat dependent upon the scrubbing action of other more readily condensible constituents present in the gas. The effectiveness of the scrubbing action will depend upon:

(1) The quantity of other more readily condensible material present; and (2) The effectiveness of contact of such other condensate with the residual gas prior to the separation of said gas and condensate.

To take advantage of the foregoing, I preferably prolong the time of contact between the gas and condensate within the condensers such as the first-stage and second-stage condensers by introducing the gas thereto at the top, causing the gas to flow downwardly through the condensers, and thus maintain the condensate in contact with the gas over the preponderant portion of its path of flow through the condenser or condensers and thereby increase the efficiency of separation. Since all freshly condensed material is thus taken into solution in previously condensed material, I thereby also decrease the danger of freeze-ups due to the formation of benzol ice and/or water ice in the condensers.

The increased effectiveness may perhaps be better realized by considering what occurs when the gas (containing the vapors of hydrocarbons condensible at various points over a relatively wide range of temperatures) is passed upwardly in a condenser. For simplicity, assume the gas to be a mixture of normally gaseous hydrocarbons plus the vapors of two hydrocarbons readily condensible but possessing different vapor pressures—say benzene and toluene. As the gas enters the bottom of the condenser and passes upwardly therethrough condensation occurs, but with the less volatile toluene more strongly condensed and the liquid condensate particles rapidly removed from the gas stream. There will accordingly be a progressive stripping action with the condensate particles becoming increasingly rich in benzene nearer the top of the condenser. The freezing points of the mixtures in the newly formed condensate particles therefore will rapidly rise towards the top of the condenser (since pure benzene freezes at 5.56° C., while pure toluene freezes at —95.0° C.) and accordingly the danger of freeze-ups with consequent stoppage of the condenser is greatly enhanced for any given condenser temperatures. Moreover, since the liquid condensate particles are thrown out or stripped from the gas substantially immediately as they are formed, they can only exert a minimum of scrubbing action with respect to any other and perhaps more volatile hydrocarbons that may be present in the gas mixture. In other words, in such a case the liquid condensate particles are maintained in contact with the gas only over a relatively minor portion of its path of flow in the condenser.

However, when the gas flow is downward in the condenser the liquid condensate particles which form are maintained in contact with the gas mixture over the preponderant portion of its path of flow therein and hence exert a relatively great scrubbing action with respect to any more volatile hydrocarbons that may be present in the gas. In addition, the composition of the mixture making up these particles is sufficiently rich in toluene in all parts of the condenser to substantially eliminate any danger of freeze-ups, since the presence of the increased proportions of toluene insures a liquid mixture of low freezing point relative to that of pure benzene.

Inasmuch as the bulk of the benzene and water vapors will have been removed from the gas by the time it leaves the second-stage condenser, it becomes possible to safely reduce the gas to still lower temperatures for the further recovery of $C_5$ hydrocarbons and, if desired, substantial portions of $C_4$ hydrocarbons and/or hydrocarbons of a smaller number of carbon atoms.

At this point I find it particularly advantageous to employ in addition to low temperatures a scrubbing medium of very low freezing point and of satisfactory fluidity at the low temperatures involved.

As such a scrubbing medium, I may use toluene (F. P. —95° C.). The economic advantage of scrubbing with a medium such as toluene becomes outstanding at this stage (1) because it lowers the freezing point of any benzene and water present, and (2) because the necessity for extremely low refrigeration temperatures (e. g., such as —65° C. to —70° C.) is avoided.

Since commercial grades of toluene may contain water in amounts which, while relatively low, may decrease its dehydrating action and in fact may be sufficient to cause stoppages in a scrubbing tower when operating at temperatures of the order of say —40° C., I generally prefer to remove the water from any such toluene by any suitable dehydrating method before using it as the scrubbing agent. For instance, I may previously reduce the temperature of the toluene to, say —75° C., and filter or otherwise separate from it any solid material which forms at that temperature, thus removing as "ice" any small amounts of more readily solidifiable material (such as water or benzene) which might otherwise give rise to stoppages.

The scrubbing of gas with dehydrated toluene under temperature conditions substantially below 0° C. to recover volatile hydrocarbon material is described and claimed in copending application, Serial No. 355,577, filed May 16, 1940, by Joseph B. Claffey.

Returning again to the condensing system, with the average benzol-toluol ratio in gas treated according to my invention the final temperature of the second-stage condenser may be carried as low as say about —20° C. or possibly lower without serious stoppage. The amount of benzol remaining in the gas beyond this point is usually insufficient to give any appreciable benzol ice in the subsequent stages. To further insure the latter condition, however, I may increase the mol percent of toluene in the gas at this point by any suitable means such as by passing the gas over liquid toluene, injecting toluene as vapor or finely-divided liquid into the gas, or otherwise. The net result is that the temperature at which benzol will separate as a solid from the condensate is correspondingly reduced.

In any event, the minimum temperature in the second-stage condenser may be adjusted to a point just above the freezing point of the benzol of the condensate separated therein. This point is a function of the benzol-toluol ratio in the condensate and of the conditions under which the condensation is conducted in this stage (i. e., with respect to the amount of scrubbing action of the condensate upon the gas).

The gas leaving the second stage condenser and whether increased in toluene concentration or not is introduced into a third-stage condenser wherein the gas is scrubbed countercurrently with a substance of very low freezing point, such as toluene which may be introduced as a spray or contacted with the gas in any other suitable manner.

The third-stage condenser may conveniently take the form of a vapor-liquid contacting tower such as a tower of the packed type, or of any other suitable construction.

I prefer to use a tower affording sufficient liquid "hold-up" to permit the gas and liquid phases to reach at least substantially equilibrium conditions therein.

By thus combining a chilling with a scrubbing action, I am able to effect a substantially complete removal of the valuable $C_5$ unsaturated hydrocarbons in the gas (e. g., cyclopentadiene, piperylene, isoprene, etc.) as well as of a considerable proportion of the valuable $C_4$ unsaturated hydrocarbons (e. g., butadiene, butylene, isobutylene, etc.).

By the use of toluene scrubbing in the third stage of cooling the recovery of the relatively more valuable hydrocarbons is increased because the increased proportion of toluene in the liquid phase results in an increased partial pressure of toluene in the gas phase. Since the total pressure is not substantially increased the result is a decrease in the partial pressures in the gas phase of the more valuable hydrocarbons. In other words, the partial pressures of the remaintaining constituents in the gas phase (i. e., of constituents including the valuable $C_4$ and $C_5$ hydrocarbons) must decrease proportionately to compensate for the increased toluene partial pressure in the gas phase. In decreasing, these constituents are to that extent condensed into the liquid phase, thus effecting their separation from the gas containing them.

This portion of the process can be regarded in terms of an absorption phenomenon, wherein the toluene absorbs or dissolves out a portion of the $C_4$ and $C_5$ hydrocarbons contained in the gas which it contacts.

However the recovery mechanism be regarded, I find that I am able to obtain a toluene effluent from the condenser-scrubber which contains dissolved therein substantially all the valuable $C_5$ hydrocarbons and a substantial portion of the valuable (but more volatile) $C_4$ hydrocarbons.

This effluent may be conducted to a stripping still for the separation of the valuable $C_4$ and $C_5$ unsaturated hydrocarbons from the toluene. The gas from the final condenser may be further treated (e. g., for the recovery of residual quantities of butadiene as well as propylene and ethylene) or, if desired, it may be used directly as a fuel gas.

Since this gas may contain in the aggregate important amounts of toluene carried from the condenser-scrubber I may recover such toluene by further treating the gas by some suitable method (e. g., absorption, as with scrubbing oil; adsorption, as in activated carbon; compression and/or refrigeration) prior to, or in conjunction with, any other after-treatment.

My invention thus far described in general terms may now be more particularly described in terms of a preferred embodiment thereof, shown in the accompanying drawing.

Gas from the gas manufacturing set (such as any apparatus wherein petroleum oil is decomposed) flows through pipe 1 into the indirect heat exchanger 3 wherein it is cooled to a desired temperature such as 20° C. Cooling may be and is shown as being accomplished by means of cold condensate from a subsequent condensing stage. The cooled gas after the separation of any condensate (which may be withdrawn from the cooler via line 4) flows through pipe 5 into the top of condenser 7, which conveniently may be of the indirect tube type. Here the gas is cooled to a desired temperature such as just above the freezing point of water, for instance, to about 2° C. Cooling may be by means of ice water or brine or other refrigerating medium. As shown in the drawing, the spent cooling medium leaves the top of the condenser at 9, flows through the cooler 11 and enters the bottom of the condenser through pipe 13 at a suitably reduced temperature. The indirect heat-exchange between the gas and the cooling medium is preferably countercurrent to maintain minimum temperatures at or near the gas outlet of the condenser. However, concurrent heat-exchange may be employed if desired.

Within the condenser some water, benzene, toluene, xylene and possibly other hydrocarbons will separate from the gas. The flow being downward in the condenser, the droplets of condensate will exert a scrubbing action upon the gas as it flows concurrently therewith which will materially increase the degree of separation.

The condensate leaves the bottom of the condenser 7 through pipe 15 which connects with pipe 17. The condensate as shown flows through pipe 17 through the gas cooler or indirect heat exchanger 3, through pipe 19, and then into the water separator or settling tank 21, where the water is separated and drained off through pipe 23 while the hydrocarbon condensate is drawn off as at 25 for further recovery steps or for any other desired use.

The gas from the condenser 7, freed of substantial amounts of readily condensible vapors, such as water and benzene and cooled to a desired temperature such as about 2° C., flows through pipe 27 and as shown into the mist extractor 29 and out through pipe 31. The mist extractor, if employed, may be of any suitable or conventional design for removing entrained droplets from gas. For instance, it may be designed to cause the gas to sharply reverse its direction of flow and then pass through a relatively coarse filtering medium, such as a layer of steel wool.

Liquid material removed from the gas in the mist extractor flows through pipe 33 into the condensate pipe 17.

The gas then flows into the drying tower 35 wherein a large part or substantially all of the residual water and/or water vapor is removed. Any suitable dehydrating agent may be used for this purpose although I prefer a solid material. A layer of coarse calcium chloride granules in the gas inlet side of the drying tower followed by a layer of fine calcium chloride particles is well suited for the purpose. However, other dehydrating agents such as "dehydrite" (magnesium perchlorate), alumina, silica gel, $P_2O_5$, etc., may be used alone or in combination with calcium chloride or otherwise. Similarly, a liquid dehydrating agent, such as glycol, glycerol or concentrated sulfuric acid, might be employed by suitably modifying the apparatus. However, highly reactive dehydrating agents such as $P_2O_5$ and sulfuric acid may have an undesired effect upon certain of the valuable constituents in the gas undergoing treatment and, hence, their use would not ordinarily be preferred.

In flowing through the dehydrating apparatus the temperature of the gas might be somewhat raised by reason of heat evolved during sorption or hydration or by heat exchange with the environment if not prevented by insulation.

Thus freed of water, the dry gas may, if desired, be conducted through pipe 37 into a toluene contactor 39, which I may or may not provide. The contactor may be of any desired construction such as a small horizontally partitioned tank with toluene maintained below the partition thereof in a lower chamber. The partition is provided with a series of holes into each of which wicking material is inserted. The gas flows through the upper chamber and past the toluene-saturated wicks and in so doing vaporizes toluene into the gas stream. Heating means (not shown) such as a steam coil may be associated with the toluene contactor so that the quantity of toluene taken up by the gas may be governed by the temperature maintained therein.

The gas leaves the toluene contactor 39 and flows by way of pipe 41 into the top of condenser 43 which may conveniently be of the indirect tube type similar to condenser 7. It is preferably of sufficient cooling capacity, and is preferably cooled with a suitable cooling medium to maintain the condenser temperature in a range which will lower the exit gas temperature suitably, say to about $-20°$ C. or even as low as say about $-30°$ C. To this end I provide a circulatory cooling system denoted by elements 45, 47 and 49 which may be generally similar to those of the first-stage condenser elements 9, 11, and 13, except that I must employ a cooling medium of lower freezing point than water. Toluene as the cooling medium and "dry ice" (solid carbon dioxide) as the refrigerating agent for the toluene are admirably adapted for creating the relatively lower temperature in the second-stage condenser.

The condensate from this second-stage condenser leaves by way of pipe 51 and flows into the condensate main 17 to recovery. Alternatively, a part or all of the condensate from the second-stage condenser 43 may be collected and treated separately from the condensate from the first stage condenser 7. If desired, a portion may be recirculated by means such as line 53, pump 55 and line 57 to the gas flowing through the second-stage condenser whereby to keep more liquid material in circulation and thus more quickly reach equilibrium between the gas phase and the liquid phase therein.

The gas leaves the second-stage condenser at a reduced temperature, say of about $-20°$ C. or lower, at which temperature it is substantially free of vapors of benzene, water, and the like which might otherwise condense and freeze in the final low-temperature condensing stage.

The gas from the condenser 43 flows if desired through pipe 59 into a mist extractor 61 for removal of any residual condensate particles. The mist extractor 61 may be similar in construction to mist extractor 29. Any liquid condensate thus removed may be combined with the main portion of condensate withdrawn through pipe 51 by means of communicating pipe 63. The gas as shown flows from the mist extractor through pipe 65 into a toluene contactor 67, which may be similar in construction to toluene contactor 39, and thence by pipe 69 into the bottom of a third-stage low temperature scrubber-condenser 71.

Whereas the initial stages of condensing have been described as effected in coolers of the indirect heat exchange type, I prefer to carry out the final stage or stages of low temperature cooling and condensing by direct heat exchange. The scrubber-condenser 71 therefore, is of a type affording direct heat exchange such as a tower of the packed type. The gas flows upwardly through the packing which may be of any suitable type for promoting contact between the liquid cooling and scrubbing medium flowing downwardly thereover and the gas. Preferably, the packing should permit sufficient liquid "hold-up" within the tower to afford time for the gas and liquid phases to approach equilibrium conditions. Alternatively, sieve-plate or bubble-cap or other towers might be utilized.

I prefer to provide my scrubber-condenser 71 with a cooling jacket illustrated at 73 supplied with a suitable cooling medium which may be admitted through pipe 75 and discharged through pipe 77. This cooling medium may conveniently be a portion of the cold circulating scrubbing medium employed in tower 71.

The cold scrubbing medium, which may be toluene, is admitted to the top of the scrubber-condenser 71 at a desired temperature, say about $-40°$ C. through the spray line 79 and spray means 81 by which it is sprayed downwardly against the rising gas mixture. The toluene thus becomes enriched in valuable $C_4$ and $C_5$ hydrocarbons which it extracts from the gas which it intimately contacts. The lean gas, having thus been stripped of most of its content of benzene, toluene, the xylenes, styrene and the valuable $C_4$ and $C_5$ hydrocarbons, leaves the system by means of pipe 83 through which it may be led to a fuel gas utilization system or to a system for the further recovery of its remaining hydrocarbons (such as ethylene) or otherwise. Since the gas may also contain substantial amounts of toluene, it may be preferred to treat it for the removal of such toluene. It may accordingly be conducted to suitable recovery apparatus (indicated generally at 85) where the toluene is substantially completely removed from the gas prior to its discharge via pipe 87. The removal may be accomplished by any suitable means, as by absorption, adsorption, compression, or refrigeration, or any combination thereof. One method which may conveniently be utilized is that described and claimed in co-pending application Serial Number 301,329, filed October 26, 1939, by Edwin L. Hall.

The toluene containing the valuable $C_4$ and $C_5$ hydrocarbons absorbed therein flows from the bottom of the scrubber-condenser 71 through the pipe 89, the indirect heat exchanger 91, and pipe 93 to the stripping still 95 wherein the more volatile $C_4$ and $C_5$ unsaturated hydrocarbons are separated from the less voltaile toluene by any suitable means, such as distillation with or without the use of steam and with or without lowering the pressure in the stripping still. The particular details of operation with respect to this separation or stripping step will occur to persons skilled in the art upon becoming familiar with this invention. The $C_4$ and $C_5$ hydrocarbons stripped from the toluene in this manner pass from the still 95 through discharge pipe 97.

The thus-stripped toluene is recycled back through the pipe 99 to the heat exchanger 91 wherein it may be somewhat cooled by indirect heat exchange with the cold toluene mixture from the scrubber-condenser 71, at the same time preheating the latter prior to its introduction into the stripping still. The cooled stripped toluene then flows through pipe 101 into the chiller 103 wherein its temperature is suitably lowered further to say about −40° C. From the chiller (which conveniently may use solid carbon dioxide as the refrigerant) the toluene flows to the cooling jacket 73 by means of pipe 75 and to the toluene scrubbing spray by means of pipe 79.

Fresh toluene may be stored in supply tank 105 from which it flows through pipe 107 to the cooler 109. This cooler preferably is maintained at extremely low temperature (e. g., of the order of −70° to −75° C.) so that any water or benzene or the like solidifiable materials in the toluene supply will separate out as frozen material. The cold toluene with any thus-separated frozen material then passes through pipe 111 to separator 113 maintained at the same low temperature. Here the solid matter of all description is removed, as by filtration, and discarded as indicated diagramatically at 115. The purified toluene is delivered as make-up liquid to the circulatory system in the scrubber-condenser 71 by means of pipe 117 as needed to replace toluene losses in said system.

For simplicity, I have not shown such valves, pumps, flow meters, pressure gauges, and the like equipment as would be necessary or desirable to create and control the flow of materials in the system as their arrangement would readily occur to those skilled in the art upon becoming familiar herewith. Likewise, I have not attempted to illustrate parts in detail.

Moreover, while I have described my invention in terms of one embodiment thereof, it will be obvious that it is not limited thereto. Thus, while I mention carburetted water gas and oil gas as the gases from which valuable hydrocarbons may be recovered, other gases, such as coal gas, coke oven gas, or oil refinery gas may be similarly treated. I may use the generic term "hydrocarbon gas" therefore to conveniently designate throughout the specification and claims any or all types of gases containing hydrocarbons from which the valuable hydrocarbons indicated may be recovered.

Although generally I prefer to use three stages of cooling of which two are indirect and one direct, I may utilize more or fewer stages of each type of cooling.

The operating temperatures I mention, although well suited to preferred practice, are illustrative and may be varied to suit gases of varying origin and quality, the type of operation desired, etc.

The operation of the first-stage and second-stage surface condensers 7 and 43 has been described as taking place with downward flow of gas therein. However, since the chief purpose in providing downward flow of gas is to prolong the contact between such gas and any condensate separating therefrom over a preponderant portion of its path of flow through the condenser or condensers, my invention in its broader aspect may be said to consist in part of causing substantially concurrent flow of gas and condensate thereof in these indirect cooling stages. Accordingly, my invention contemplates the cooling of the gas in any type and/or arrangement of equipment which will bring about this important result. Instead of flowing substantially vertically downward as diagrammatically illustrated according to one preferred embodiment, the gas may therefore be caused to flow in a generally inclined direction—the inclination of which may vary from substantially zero with respect to the vertical (i. e., the flow may be substantially vertically downward as shown) to substantially ninety degrees with respect to the vertical (i. e., the flow may be substantially horizontal). In any case the flow of gas and the flow of condensate separating therefrom will be substantially concurrent through the condenser, thus assuring maximum efficiency of separation.

It will be understood that a portion of condensate from the first-stage condenser may be recirculated thereto by means (not shown) which function similarly to those described in connection with the second-stage condenser. Also, a portion of the toluene effluent from the final-stage scrubber-condenser and containing hydrocarbons removed from the gas, may be recirculated thereto to keep more liquid material in circulation without requiring additional amounts of fresh toluene, if desired, by means not shown.

Additional heat exchangers may be utilized at points other than those indicated to effect greater heat economy.

Suitable heat insulation may be provided for all equipment operating at sub-atmospheric temperatures, as customary in the art.

If solid carbon dioxide is used to produce the necessary low temperatures a recovery system for gaseous $CO_2$ may be included.

Likewise equivalent structural features may be substituted.

Therefore, it is to be understood that the foregoing is by way of illustration and that changes, omissions, additions, substitutions, and/or modifications might be made within the scope of the claims without departing from the spirit of the invention.

I claim:

1. A method for the recovery of relatively volatile hydrocarbons from a hydrocarbon gas which comprises the steps of passing the gas downwardly in a first indirect cooling zone maintained at a temperature in the neighborhood of but above 0° C., passing the gas downwardly through a second indirect cooling zone maintained at a temperature between approximately −20° C. and −30° C., passing the gas upwardly in a direct cooling and scrubbing zone in which it is contacted with a liquid scrubbing medium comprising toluene chilled to a temperature between about −30° C. and about −50° C., said scrubbing medium being adapted to absorb substantial quantities of said unsaturated hydrocarbons from the gas, separately removing the cold scrubbed gas and the cold liquid scrubbing medium containing the said unsaturated hydrocarbons absorbed therein from said direct cooling and scrubbing zone, and stripping the said unsaturated hydrocarbons from the cold liquid scrubbing medium containing them.

2. A method as in claim 1, wherein the gas is contacted with a dehydrating agent after passing through the first indirect cooling zone to remove residual water from the gas.

3. A method for the recovery of $C_4$ and $C_5$ hydrocarbons from a manufactured gas containing in addition quantities of water vapor and relatively less volatile hydrocarbons such as benzene and toluene, which comprises passing the gas substantially downwardly through an indirect cooling zone in which the temperature is maintained in the neighborhood of but above the freezing point of water contained in the gas; contacting the gas with a dehydrating agent to remove residual water from said gas; passing the gas substantially downwardly through another indirect cooling zone in which the temperature is maintained sufficiently low to condense benzene from the gas but insufficiently low to freeze benzene in the condensate which separates therein; passing the gas upwardly through a scrubbing zone in which it is contacted countercurrently with a liquid scrubbing medium comprising toluene chilled to a temperature substantially below the temperature of the incoming gas, said scrubbing medium being adapted to absorb a substantial quantity of said relatively volatile hydrocarbons from the gas; and removing the scrubbed gas and the liquid scrubbing medium containing the said relatively volatile hydrocarbons absorbed therein from said scrubbing zone.

4. A method for the recovery of $C_4$ and $C_5$ hydrocarbons from a manufactured gas containing in addition quantities of water vapor and relatively less volatile hydrocarbons such as benzene and toluene which comprises passing the gas substantially downwardly through an indirect cooling zone in which the temperature is maintained in the neighborhood of but above the freezing point of water contained in the gas; contacting the gas with a dehydrating agent to remove residual water from said gas; passing the gas substantially downwardly through an indirect cooling zone in which the temperature is maintained sufficiently low to condense benzene from the gas but insufficiently low to freeze benzene in the condensate which separates therein; increasing the toluene concentration in said gas; passing the gas upwardly through a scrubbing zone in which it is contacted countercurrently with a liquid scrubbing medium comprising toluene chilled to a temperature substantially lower than the temperature of the incoming gas, said scrubbing medium being adapted to absorb a substantial quantity of said relatively volatile hydrocarbons from the gas; and removing the scrubbed gas and the liquid scrubbing medium containing the relatively volatile hydrocarbons absorbed therein from said scrubbing zone.

5. A method for the recovery of unsaturated hydrocarbons having more than three and less than six carbon atoms from manufactured gas containing in addition water vapor and relatively less volatile hydrocarbons such as benzene and toluene, which comprises passing the gas substantially downwardly through a cooling zone in which the temperature is maintained sufficiently low to condense the bulk of said water vapor and above the freezing point of the condensed water; passing the gas substantially downwardly through another cooling zone in which the temperature is maintained above the freezing point of benzol in the condensate which separates therein and sufficiently low to condense the bulk of the remaining benzene and toluene; passing the gas through a scrubbing zone in which it is contacted with a cold scrubbing medium having a relatively high fluidity at the scrubbing temperature, said scrubbing medium being adapted to absorb a substantial quantity of said unsaturated hydrocarbons from the gas; and recovering said unsaturated hydrocarbons from the scrubbing medium.

6. A process for the separation of benzene from manufactured gas containing significant quantities of benzene, toluene, and water vapor as well as material of higher vapor pressure than benzene which comprises cooling said gas sufficiently to remove therefrom by condensation a considerable proportion of said water vapor but insufficiently to cause the formation of solid phase in the resulting condensate, thereafter subjecting said gas to dehydration to remove residual water vapor, and thereafter subjecting said gas to further cooling to condense benzene therefrom while maintaining the ratio of the concentration of toluene in the resulting condensate sufficiently high with respect to the concentration of benzene therein to avoid freezing said condensed benzene under the temperature conditions maintained in said further cooling.

7. A process for the separation of benzene from manufactured gas containing significant quantities of benzene, toluene, and water vapor as well as material of higher vapor pressure than benzene which comprises cooling said gas in a cooling zone sufficiently to remove by condensation a considerable proportion of said water vapor but insufficiently to cause the freezing of water in the resulting condensate, thereafter subjecting said gas to dehydration to remove residual water vapor, thereafter subjecting said gas to further cooling in a second cooling zone to condense toluene and benzene therefrom, and simultaneously maintaining the ratio of the concentration of toluene in the resulting condensate in said second cooling zone sufficiently high with respect to the concentration of benzene therein to avoid freezing said condensed benzene under the temperature conditions maintained in said second cooling zone by conducting said further cooling by passing the gas downwardly through said second cooling zone in concurrent flow contact with the toluene-containing condensate formed therein.

8. A process for the separation of benzene from manufactured gas containing significant quantities of benzene, toluene, and water vapor as well as material of higher vapor pressure than benzene which comprises cooling said gas in a cooling zone sufficiently to remove a considerable portion of said water vapor by condensation but insufficiently to cause the formation of solid phase in the resulting condensate, thereafter subjecting said gas to dehydration to remove residual water vapor, and thereafter subjecting said gas to further cooling in a second cooling zone by passing said gas downwardly therethrough, condensing toluene and benzene from said gas in said second cooling zone, flowing condensate containing toluene condensed from the gas in the upper portion of said second cooling zone downwardly through said cooling zone in contact with said gas and thereby condensing benzene from said gas in the lower portion of said cooling zone in the presence of toluene condensed from said gas in the upper portion of said cooling zone, thereby maintaining the concentration of said toluene in said condensate throughout said cooling zone sufficiently high with respect to the concentration of benzene therein to prevent the freezing of benzene contained in said condensate under the temperature conditions maintained in said second cooling zone.

9. A process for the separation of benzene from manufactured gas containing significant quantities of benzene, toluene, and water vapor as well as material of higher vapor pressure than benzene which comprises cooling said gas in a cooling zone sufficiently to remove by condensation a considerable portion of said water vapor but insufficiently to cause the formation of solid phase in the resulting condensate, thereafter subjecting said gas to dehydration to remove residual water vapor, and thereafter subjecting said gas to further cooling in a second cooling zone to condense benzene therefrom while maintaining the ratio of the concentration of toluene in the liquid phase material present in said second cooling zone sufficiently high with respect to the concentration of benzene therein to depress the freezing point of benzene in said liquid phase material sufficiently to avoid the freezing of benzene therein by condensing said benzene in said second cooling zone in the presence of added toluene.

10. A process for the separation of benzene from manufactured gas containing significant quantities of benzene, toluene, and water vapor as well as material of higher vapor pressure than benzene which comprises reducing the temperature of said gas in a cooling zone sufficiently to remove the bulk of said water vapor therefrom by condensation but insufficiently to cause the freezing of the resulting condensed water, thereafter subjecting said gas to dehydration to remove residual water vapor, and thereafter condensing toluene and benzene from said gas by subjecting said gas to further cooling in a second cooling zone while maintaining the ratio of the concentration of toluene in the resulting condensate in said second cooling zone sufficiently high with respect to the concentration of benzene therein to avoid freezing said condensed benzene under the temperature conditions maintained in said second cooling zone, said toluene-benzene concentration ratio being maintained by passing gas and resulting condensate downwardly in contact with each other through said second cooling zone and by condensing benzene therein in the presence of added toluene.

11. A process for the separation of benzene and hydrocarbon material of higher vapor pressure than benzene from manufactured gas containing significant quantities of benzene, toluene, and water vapor as well as hydrocarbon material of higher vapor pressure than benzene which comprises cooling said gas sufficiently to remove therefrom by condensation a considerable proportion of said water vapor but insufficiently to cause the formation of solid phase in the resulting condensate, thereafter subjecting said gas to dehydration to remove residual water vapor, thereafter subjecting said gas to further cooling to condense therefrom benzene and hydrocarbon material of higher vapor pressure than benzene while maintaining the ratio of the concentration of toluene in the resulting condensate sufficiently high with respect to the concentration of benzene therein to avoid freezing said condensed benzene under the temperature conditions maintained in said further cooling.

12. The process according to claim 11 in which the step of further cooling the gas to condense therefrom benzene and hydrocarbon material of higher vapor pressure than benzene includes the scrubbing of said gas in a scrubbing zone with a liquid scrubbing medium comprising toluene chilled to a temperature substantially lower than that of the incoming gas.

NEWCOMB K. CHANEY.